US009758675B2

(12) United States Patent
Yamamoto et al.

(10) Patent No.: US 9,758,675 B2
(45) Date of Patent: Sep. 12, 2017

(54) EMULSION-BASED HIGH RELEASE ADDITIVE FOR RELEASE SHEET, EMULSION COMPOSITION FOR RELEASE SHEET, AND MOLD RELEASE SHEET

(71) Applicant: SHIN-ETSU CHEMICAL CO., LTD., Tokyo (JP)

(72) Inventors: Kenji Yamamoto, Annaka (JP); Toshiaki Ihara, Annaka (JP); Tsutomu Nakajima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/399,707

(22) PCT Filed: May 17, 2013

(86) PCT No.: PCT/JP2013/063750
§ 371 (c)(1),
(2) Date: Nov. 7, 2014

(87) PCT Pub. No.: WO2013/176043
PCT Pub. Date: Nov. 28, 2013

(65) Prior Publication Data
US 2015/0119518 A1 Apr. 30, 2015

(30) Foreign Application Priority Data
May 25, 2012 (JP) .................................. 2012-119402

(51) Int. Cl.
C08L 83/04 (2006.01)
C08G 77/44 (2006.01)
C08L 83/10 (2006.01)
C08G 77/14 (2006.01)

(52) U.S. Cl.
CPC .............. *C08L 83/04* (2013.01); *C08G 77/44* (2013.01); *C08L 83/10* (2013.01); *C08G 77/14* (2013.01); *C08L 2201/54* (2013.01)

(58) Field of Classification Search
CPC .................................................... C08L 83/04
USPC .................. 524/500, 261; 428/447; 427/387
See application file for complete search history.

(56) References Cited

U.S. PATENT DOCUMENTS

| 3,527,659 A | 9/1970 | Keil |
| 4,882,377 A | 11/1989 | Sweet et al. |
| 5,973,061 A | 10/1999 | Feder et al. |
| 2003/0065086 A1* | 4/2003 | Kosal .................. C08J 3/03 524/588 |
| 2007/0087207 A1 | 4/2007 | Irifune |
| 2007/0191553 A1 | 8/2007 | Dhaler et al. |
| 2007/0275255 A1* | 11/2007 | Ooms .................. C09J 183/10 428/447 |
| 2009/0011254 A1 | 1/2009 | Yamamoto et al. |
| 2011/0160376 A1* | 6/2011 | Hori ..................... C08G 77/44 524/500 |
| 2012/0328863 A1* | 12/2012 | Kuo ..................... C09J 183/04 428/220 |

FOREIGN PATENT DOCUMENTS

| EP | 0216376 A1 | 4/1987 |
| EP | 0400614 A2 | 12/1990 |
| JP | 49-27033 B1 | 7/1974 |
| JP | 57-29676 A | 2/1982 |
| JP | 59-84953 A | 5/1984 |
| JP | 5-53183 B2 | 8/1993 |
| JP | 6-86582 B2 | 11/1994 |
| JP | 10-110156 A | 4/1998 |
| JP | 2742835 B2 | 4/1998 |
| JP | 2750896 A2 | 5/1998 |
| JP | 10-245540 A | 9/1998 |
| JP | 11-61094 A | 3/1999 |
| JP | 2000-86893 A | 3/2000 |
| JP | 2005-509046 A | 4/2005 |
| JP | 2007-106908 A | 4/2007 |
| JP | 2007-523225 A | 8/2007 |
| JP | 2009-12317 A | 1/2009 |
| JP | 2010-37557 A | 2/2010 |
| WO | WO 2011/087146 | * 7/2011 |

OTHER PUBLICATIONS

International Search Report for PCT/JP2013/063750 mailed on Aug. 20, 2013.
Written Opinion of the International Searching Authority for PCT/JP2013/063750 mailed on Aug. 20, 2013.
Extended European Search Report dated Feb. 4, 2016 for Application No. 13794455.9.

* cited by examiner

*Primary Examiner* — Deve E Valdez
(74) *Attorney, Agent, or Firm* — Birch, Stewart, Kolasch & Birch, LLP

(57) ABSTRACT

The present invention relates to an emulsion-based high release additive for a release sheet, the additive being characterized by being obtained by dispersing in water a condensation product (A) obtained by subjecting the following to a dehydration condensation reaction: (A-1) a polydiorganosiloxane which has an average degree of polymerization of 100-300,000 and which has one or more hydroxyl groups or hydrolyzable groups per molecule; and (A-2) a polyorganosiloxane resin, which contains ($SiO_{4/2}$) units and ($R_3SiO_{1/2}$) units (in the formulae, the R groups each represent independently a monovalent hydrocarbon group having 1-12 carbon atoms and not having an aliphatic unsaturated bond or an alkenyl group having 2-6 carbon atoms) as primary components, in which the molar ratio of ($R_3SiO_{1/2}$) units relative to ($SiO_{4/2}$) units is 0.6-1.2 and in which the total content of hydroxyl groups and hydrolyzable groups is not lower than 2.1 mass % and lower than 10.0 mass %. The present invention can obtain a silicone cured coating film having a high release force by adding the additive to a curable composition for a release sheet such as a release paper or release film, coating the same on a variety of base materials and curing.

13 Claims, No Drawings

EMULSION-BASED HIGH RELEASE ADDITIVE FOR RELEASE SHEET, EMULSION COMPOSITION FOR RELEASE SHEET, AND MOLD RELEASE SHEET

TECHNICAL FIELD

This invention relates to a release sheet-forming emulsion high-release additive which is added to a silicone emulsion composition of addition or condensation cure type for use in the release sheet application to endow it with a high release force, a release sheet-forming emulsion composition comprising the same, and a release sheet such as release paper or release film.

BACKGROUND ART

One prior art approach for preventing adhesion and anchorage of pressure-sensitive adhesive materials to substrates of paper or plastics is to form a cured coating of silicone composition on the substrate surface to impart release properties. The methods of forming a cured silicone coating on the substrate surface include a method of forming a release coating via addition reaction, which is widely employed because of satisfactory cure and an ability to match with a variety of release requirements covering from low-rate peel to high-rate peel. Also the method of forming a release coating via condensation reaction, which is implemented earlier in practice, is still used at the present since it has the advantage that it is insensitive to addition reaction catalyst poisons.

The method of forming a release coating via reaction cure encompasses a solvent type wherein a silicone composition is dissolved in organic solvent, an emulsion type wherein a silicone composition is dispersed in water using an emulsifier, and a solventless type composed solely of a silicone composition. Since the solvent type has the drawback that it is sometimes harmful to the human body or environment, the safety aspect pushes a changeover from the solvent type to the solventless or emulsion type in progress. The emulsion type is expected to find expanding utility in the future because it is not only safe, but also advantageous from the application aspect in that it can be arbitrarily diluted with water or arbitrarily mixed with another aqueous material or emulsion material.

In general, the curable silicone compositions for release paper are desired to have varying release forces depending on their purpose. In the application where tight release is necessary, a composition having added thereto an alkenyl-containing MQ resin is widely used. Herein M units designate $R'_3SiO_{1/2}$ units, Q units designate $SiO_{4/2}$ units, and R' is a monovalent hydrocarbon group (the same applies hereinafter).

However, the tight release effect of the alkenyl-containing MQ resin is not so high, and sometimes, the release force does not reach the desired level even when the resin is added in large amounts. Since the alkenyl-containing MQ resin is expensive, the addition of large amounts is unfavorable in cost. There is a need for a composition which can achieve a tight release effect when added in minute amounts. It is also known that the alkenyl-containing MQ resin has the tendency that the release force decreases with the lapse of time as compared with that developed immediately after cure. There is a need for an additive ensuring that the release force remains unchanged with the lapse of time.

JP-B H05-53183 (Patent Document 1) discloses a release paper-forming silicone composition comprising an alkenyl-containing MQ resin in admixture with alkenyl-free MQ resin. The change with time of release force is reduced, but the tight release effect is insufficient.

JP 2750896 (Patent Document 2) discloses a release paper-forming solvent type silicone composition of addition reaction type comprising an alkenyl-containing resin. Low-temperature cure and release force with a little change with time are achieved, but the release force is not so high because tightening of release is not intended.

JP 2742835 (Patent Document 3) discloses an addition reaction type organopolysiloxane composition having added thereto an equilibration reaction product of a vinyl-containing organopolysiloxane and an organopolysiloxane of the formula: $(R'_3SiO_{1/2})_a(R'_2SiO)_b(R'SiO_{3/2})_c(SiO_{4/2})_d$ wherein R' is a monovalent hydrocarbon group, a, b, c and d indicative of molar fractions of respective siloxane units are a=0.1 to 0.6, b=0 to 0.45, c=0 to 0.3, and d=0.3 to 2.0. The reaction product is deemed to be an MQ resin having vinyl-terminated siloxane bonded thereto.

However, Patent Document 3 refers nowhere to the optimum range of structure. In Example, 40 parts by weight of dimethylpolysiloxane having a degree of polymerization of 8,000 and containing vinyl at both ends and 60 parts by weight of a 30 wt % toluene solution of polyorganosiloxane consisting of $(R'_3SiO_{1/2})_a$ units (M units) and $(SiO_{4/2})$ units (Q units) in a molar ratio of 0.8/1 are heat treated at 100° C. for 5 hours in the presence of potassium hydroxide as catalyst, and the product is used to formulate a high-release additive composition. Because of its extremely high degree of polymerization, the product must be diluted with an organic solvent before it can be used. The tight release effect is about 2 to 3.8 times when 10 parts by weight of the high-release additive is blended, and is still insufficient.

As the method of gaining tight release by adding a polyorganosiloxane resin having pressure-sensitive adhesiveness to an addition reaction type organopolysiloxane composition, the following technique is reported.

JP-B H06-086582 (Patent Document 4) relates to a pressure-sensitive adhesive silicone protective coating agent comprising a curable silicone rubber and a product obtained from partial dehydration condensation of a both end hydroxyl-containing organopolysiloxane and a MQ unit-containing silicone resin. This needs a solvent because the silicone rubber is used. Patent Document 4 relates to the pressure-sensitive adhesive technology and refers nowhere to the tight release effect of release control agent for release paper. Also no descriptions are found other than the blending ratio of the silicone rubber and MQ unit-containing silicone resin.

JP-A H10-110156 (Patent Document 5) relates to a silicone-based pressure-sensitive adhesive based on a mixture or partial condensate of vinyl raw rubber and MQ resin. This needs a solvent because the silicone rubber is used. Patent Document 5 refers nowhere to the tight release effect of release control agent for release paper.

JP-A 2010-37557 (Patent Document 6) discloses a release modifier comprising an organopolysiloxane resin-organopolysiloxane condensation product that is obtained by the condensation reaction of (a1) 100 parts by weight of MQ-type resin in which the molar ratio of M units to Q units is 0.6 to 1.0 and the content of hydroxyl or alkoxy group is 0.3 to 2.0% by weight with (a2) 20 to 150 parts by weight of chain-form diorganosiloxane containing a hydroxyl or alkoxy group and having an average degree of polymerization of 100 to 1,000. Patent Document 6 describes that the release force measured at a low peel rate of 0.3 m/min in Example is increased only by a factor of 1.4 to 2.2 over Comparative Example free of condensation product. No sufficient tight release effect is obtained. This is presumably because component (a1) has a hydroxyl or alkoxy content which is as low as 0.3 to 2.0% by weight and offers few reaction sites with component (a2) and the product does not possess a crosslinked structure obtained from full condensation.

SUMMARY OF INVENTION

Technical Problem

An object of the invention, which has been made under the above-mentioned circumstances, is to provide a release sheet-forming high-release additive of emulsion type which exerts an outstanding tight release effect and which is added in a small amount to a release sheet-forming curable silicone composition so that the silicone composition may have a desired high release force and experience only a little drop of release force with the lapse of time after curing, a release sheet-forming emulsion composition comprising the same, and a release sheet.

Solution to Problem

Making extensive investigations to attain the above object, the inventors have found that a condensation product (A) obtained from dehydration condensation reaction of (A-1) a polydiorganosiloxane having an average degree of polymerization of 100 to 300,000 and containing at least one hydroxyl group or hydrolyzable group per molecule with (A-2) a polyorganosiloxane resin primarily comprising $SiO_{4/2}$ units and $R_3SiO_{1/2}$ units, wherein R is each independently a monovalent hydrocarbon group of 1 to 12 carbon atoms free of aliphatic unsaturation or an alkenyl group of 2 to 6 carbon atoms, a molar ratio of $R_3SiO_{1/2}$ units to $SiO_{4/2}$ units is in the range of 0.6 to 1.2, and the total content of hydroxyl and hydrolyzable groups is from 2.1% to less than 10.0% by weight, in the presence of a condensation catalyst exerts an improved tight release effect; that the condensation product (A) exerts an improved high-release additive effect to a release sheet (such as release paper or film) when it is added to a release sheet-forming curable silicone composition, from which a release sheet is manufactured by coating the silicone composition to a substrate and curing to form a cured coating thereon; and in particular, that the condensation product (A) exerts an improved tight release effect even when added in small amounts, and minimizes a change of release force with time after curing. The invention is predicated on these findings.

Accordingly, the invention provides an emulsion high-release additive for a release sheet such as a release paper or film, an emulsion composition, and a release sheet, as defined below.

[1] An emulsion high-release additive for release sheets, comprising a condensation product (A) dispersed in water, the condensation product (A) being obtained from dehydration condensation reaction of (A-1) a polydiorganosiloxane having an average degree of polymerization of 100 to 300,000 and containing at least one hydroxyl group or hydrolyzable group per molecule with (A-2) a polyorganosiloxane resin primarily comprising $SiO_{4/2}$ units and $R_3SiO_{1/2}$ units, wherein R is each independently a monovalent hydrocarbon group of 1 to 12 carbon atoms free of aliphatic unsaturation or an alkenyl group of 2 to 6 carbon atoms, a molar ratio of $R_3SiO_{1/2}$ units to $SiO_{1/2}$ units is in the range of 0.6 to 1.2, and the total content of hydroxyl and hydrolyzable groups is from 2.1% by weight to less than 10.0% by weight.

[2] The emulsion high-release additive of [1] wherein the polydiorganosiloxane (A-1) and the polyorganosiloxane resin (A-2) are mixed in a weight ratio of 30:70 to 70:30.

[3] The emulsion high-release additive of [1] or [2] wherein the condensation product (A) has a residual hydroxyl group content of up to 0.3% by weight.

[4] The emulsion high-release additive of any one of [1] to [3] wherein the polydiorganosiloxane (A-1) has an average degree of polymerization of 100 to 30,000.

[5] The emulsion high-release additive of [4] wherein the polydiorganosiloxane (A-1) has an average degree of polymerization of 100 to 3,000 and contains two hydroxyl groups per molecule.

[6] The emulsion high-release additive of [5] wherein the polydiorganosiloxane (A-1) has an average degree of polymerization of 1,000 to 3,000 and contains two hydroxyl groups per molecule.

[7] The emulsion high-release additive of any one of [1] to [6] wherein the condensation product (A) is further treated with chlorosilane for neutralization and hydroxyl capping.

[8] An emulsion composition for release sheets, obtained by dispersing components (A), (B-1) and (C-1) in water in the presence of component (D), (A) 100 parts by weight of the condensation product of any one of [1] to [7], (B-1) 1 to 1,000 parts by weight of an aliphatic unsaturation-bearing polydiorganosiloxane containing at least two aliphatic unsaturated groups per molecule and having a viscosity of up to 100 Pa·s at 25° C., (C-1) an organohydrogenpolysiloxane containing at least two Si—H groups per molecule and having a viscosity of up to 1 Pa·s at 25° C., in such an amount that the molar amount of Si—H groups is 0.1 to 10 times the total molar amount of aliphatic unsaturated groups in components (A) and (B-1), (D) an emulsifier in an amount of 0.1 to 20 parts by weight per 100 parts by weight of components (A), (B-1) and (C-1) combined.

[9] An emulsion composition for release sheets, obtained by dispersing components (A), (B-2) and (C-2) in water in the presence of component (D), (A) 100 parts by weight of the condensation product of any one of [1] to [7], (B-2) 1 to 1,000 parts by weight of a hydroxyl-bearing polydiorganosiloxane containing at least two hydroxyl groups per molecule and having a viscosity of up to 100 Pa·s at 25° C., (C-2) a hydrolyzable group-bearing polyorganosiloxane containing at least two hydrolyzable groups per molecule and having a viscosity of up to 1 Pa·s at 25° C., in such an amount that the molar amount of hydrolyzable groups is 0.1 to 200 times the total molar amount of hydroxyl groups in components (A) and (B-2), (D) an emulsifier in an amount of 0.1 to 20 parts by weight per 100 parts by weight of components (A), (B-2) and (C-2) combined.

[10] A release sheet comprising a sheet-like substrate and a cured film formed on at least one surface of the substrate from a curable silicone composition having added thereto the additive of any one of [1] to [7] or the emulsion composition of [8] or [9].

Advantageous Effects of Invention

The emulsion high-release additive of the invention helps to form a cured silicone coating having a high release force when it is added to a curable silicone composition for a release sheet such as release paper or film, and the composition is coated and cured to various substrates. The additive exerts an improved tight release effect even when added in small amounts. The release force is adjustable by changing the addition amount, and a change with time of the release force of cured coating is minimized.

DESCRIPTION OF EMBODIMENTS

Now the invention is described in detail.
[Component (A-1)]
Component (A-1) is a polydiorganosiloxane having an average degree of polymerization of 100 to 300,000 and containing at least one hydroxyl group or hydrolyzable group per molecule, as exemplified by one having the general formula (A-1a).

[Chemical Formula 1]

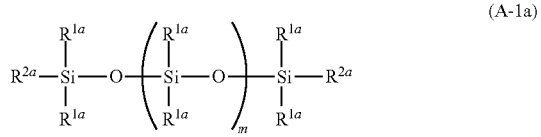

(A-1a)

Herein $R^{1a}$ which may be the same or different is a monovalent hydrocarbon group of 1 to 10 carbon atoms free of aliphatic unsaturation, $R^{2a}$ is a hydroxyl group or hydrolyzable group, and m is an integer of 100 to 300,000.

In general formula (A-1a), $R^{1a}$ is each independently selected from monovalent hydrocarbon groups of 1 to 10 carbon atoms free of aliphatic unsaturation, for example, alkyl groups preferably of 1 to 6 carbon atoms such as methyl, ethyl, propyl and butyl, cycloalkyl groups preferably of 5 to 8 carbon atoms such as cyclohexyl, and aryl groups preferably of 6 to 10 carbon atoms such as phenyl and tolyl, with methyl being most preferred.

$R^{2a}$ is a hydroxyl group or hydrolyzable group. The hydrolyzable groups include alkoxy groups of 1 to 6 carbon atoms, halogen atoms, acyloxy groups and oxime groups. Component (A) preferably has a structure wherein $R^{2a}$ is hydroxyl, especially a structure having two hydroxyl groups per molecule. Of the alkoxy groups, those of 1 to 6 carbon atoms are preferred, examples of which include methoxy, ethoxy, propoxy and butoxy. Exemplary of the halogen atom are chlorine and bromine.

With respect to the average degree of polymerization (DOP), the polysiloxane of formula (A-1a) should have an average DOP=m of 100 to 300,000, preferably 100 to 30,000, more preferably 100 to 3,000, and even more preferably 1,000 to 3,000. A DOP of less than 100 indicates more silicone molecules left unreacted, leading to a lowering of release force. Such a lowering of release force is avoided by the polysiloxane having an average DOP of at least 1,000 and containing at least two hydroxyl groups per molecule, which is preferred. A structure having a hydroxyl group at both ends is more preferred. An average DOP in excess of 300,000 indicates that the dehydration condensation product has too high a viscosity. The product may be difficult to disperse uniformly in a coating which is obtained by mixing the product with a silicone emulsion composition for release paper or film and curing the composition. The coating film may be worsened in outer appearance. From the industrial aspect, the polysiloxane having an average DOP of up to 30,000 is preferred as component (A-1). More preferably the polysiloxane having a lower average DOP of up to 3,000 is used when ease of mixing with other components and fluidity are considerations from the aspect of handling of component (A).

Notably, the average DOP is determined by $^{29}$Si—NMR analysis, computing integrated values of peaks corresponding to —Si($R^{1a}$)$_2$—O units (D units) and $CH_3$—Si($R^{1a}$)$_2$—O— units (M units), and converting the values to $M_2D_x$, wherein x is indicative of a DOP (the same applies hereinafter). $R^{1a}$ is as defined above.

[Component (A-2)]
Component (A-2) is a polyorganosiloxane resin primarily comprising $SiO_{4/2}$ units (Q units) and $R_3SiO_{1/2}$ units (M units), wherein R is each independently a monovalent hydrocarbon group of 1 to 12 carbon atoms free of aliphatic unsaturation or an alkenyl group of 2 to 6 carbon atoms. Herein a molar ratio of $R_3SiO_{1/2}$ units to $SiO_{4/2}$ units is in the range of 0.6 to 1.2, preferably 0.7 to 1.1, and more preferably 0.75 to 1.0. If the ratio of M units to Q units is less than 0.6, the dehydration condensation product has too high a viscosity and is difficult to synthesize. If the ratio exceeds 1.2, the DOP cannot be increased, leading to a lowering of tight release effect.

In the formula, R is each independently a monovalent hydrocarbon group of 1 to 12 carbon atoms free of aliphatic unsaturation or an alkenyl group of 2 to 6 carbon atoms. Examples of the monovalent hydrocarbon group of 1 to 12 carbon atoms, represented by R, include alkyl groups preferably of 1 to 6 carbon atoms such as methyl, ethyl, propyl and butyl, aryl groups preferably of 6 to 10 carbon atoms such as phenyl and tolyl, and aralkyl groups of 7 to 10 carbon atoms such as benzyl. Examples of the alkenyl group of 2 to 6 carbon atoms include vinyl, allyl and butenyl.

In this embodiment, the polyorganosiloxane resin is obtainable from cohydrolytic condensation of tetraorganoxysilane with triorganomonoorganoxysilane. The resin thus contains $R^3SiO_{3/2}$ units (T units) derived from tetraorganoxysilane and in some cases, further contains $R^3_2SiO_{2/2}$ units (D units).

Herein $R^3$ is a hydroxyl group, or a hydrolyzable group such as an alkoxy group of 1 to 6 carbon atoms, acyloxy group, oxime group or halogen atom. Not all $R^3$ groups are hydroxyl. $R^3$ is preferably hydroxyl, methoxy, ethoxy or propoxy.

The total content of hydroxyl and hydrolyzable groups means the total content of hydroxyl groups and hydrolyzable functional groups as mentioned above and is from 2.1% by weight to less than 10.0% by weight, preferably 2.5% to 7.0% by weight, and more preferably 4.0% to 6.0% by weight of the polyorganosiloxane resin. If the content is less than 2.1% by weight, then the tight release effect is insignificant. This is probably because the crosslinking density due to condensation reaction is low although the reason is not well understood. If the content is equal to or more than 10.0% by weight, adhesion to the substrate is substantially worsened.

The polyorganosiloxane resin as component (A-2) may further comprise $R_2SiO_{2/2}$ units and $RSiO_{3/2}$ units wherein R is as defined above. In this embodiment, the sum of such units is 0 to 30 mol %, preferably 0 to 20 mol %, and more preferably 0 to 10 mol % of the overall polyorganosiloxane resin.

The condensation product as component (A) is obtained from condensation between hydroxyl groups on component (A-1) and hydrolyzable groups, typically alkoxy groups, on component (A-2), and between hydroxyl groups and hydrolyzable groups on component (A-2) in the presence of a catalyst. Thereafter, the majority of hydrolyzable groups are gradually converted to hydroxyl groups, followed by condensation between hydroxyl groups.

Condensation reaction between components (A-1) and (A-2) is carried out at room temperature or elevated temperature, specifically 0 to 200° C. in the presence of a catalyst, forming a sticky compound. Suitable catalysts include aqueous ammonia, amines such as ethylamine, bases such as potassium hydroxide and sodium hydroxide, titanium compounds such as tetrabutyl titanate, and hexamethyldisilazane. It is noted that the catalyst is preferably used in an amount of 0.001 to 10% by weight based on the total weight of components (A-1) and (A-2).

Herein components (A-1) and (A-2) are preferably mixed in a weight ratio in the range from 30:70 to 70:30, more preferably from 40:60 to 60:40. Outside the range, the tight release effect may decline.

The condensation product between components (A-1) and (A-2) preferably contains up to 0.3% by weight (up to 0.017 mol/100 g), more preferably up to 0.26% by weight (up to 0.015 mol/100 g) of residual hydroxyl groups. If the residual hydroxyl content exceeds 0.3% by weight, adhesion may be worsened. To improve the adhesion, chlorosilane may be added to component (A) after condensation reaction. This achieves neutralization and capping of hydroxyl groups, resulting in a reduction of hydroxyl groups. The amount of chlorosilane used is preferably 0.001 to 10% by weight based on the total weight of components (A-1) and (A-2).

Although the invention selects component (A-1) having an average DOP of 300,000 or less because component (A) having too high a viscosity is difficult to emulsify, it is also effective that the dehydration condensation product as component (A) is diluted with a low viscosity silicone before it is emulsified. In this embodiment, component (A) eventually having a viscosity of 0.4 to 100 Pa·s, especially 0.4 to 50 Pa·s is advantageously used.

The silicone used for dilution is not particularly limited as long as a compound that does not compromise the performance of a curable release sheet-forming composition to which the emulsion high-release additive of the invention is added is selected. Examples of the desired silicone for dilution include release sheet-forming compositions of addition cure type, components therein, release sheet-forming compositions of condensation cure type, and components therein, which may be used alone or in admixture of two or more. Also, components in release sheet-forming compositions of UV cure type may be used as long as they do not compromise the essential performance of the inventive composition.

Specific examples of the silicone for dilution include components (B-1), (B-2), (C-1) and (C-2) to be described later.

Notably, although it is possible to use component (A) as diluted with a solvent, the solvent dilution is unfavorable in that it is detrimental to the advantages of the emulsion composition including safety and solventless feature. However, the solvent dilution should not be excluded because the solvent dilution is effective when coating, wetting and buildup factors are industrially important. In this case, a choice is preferably made of relatively safe alcohol, ether, ketone, ester and carboxylic acid solvents.

The invention further provides an emulsion composition for forming a release sheet such as release paper or release film, comprising components (B-1), (C-1), (D) and (E), defined below, and an emulsion composition for forming a release sheet such as release paper or release film, comprising components (B-2), (C-2), (D) and (E), defined below, both in addition to the condensation product (A) as the emulsion high-release additive. These components are described below in detail.

Component (B-1) is an unsaturation-bearing polydiorganosiloxane containing an aliphatic unsaturated group, preferably at least two aliphatic unsaturated groups, typically alkenyl groups per molecule and having a viscosity of up to 100 Pa·s.

A silicone having a viscosity higher than the indicated value makes it difficult to formulate an emulsion composition. Preferably a choice is made of silicones having a viscosity of up to 10 Pa·s, more preferably up to 1 Pa·s, with the lower limit being preferably at least 0.001 Pa·s. This viscosity range broadens the acceptable viscosity range of component (A-1) and ensures that when the aliphatic unsaturation-bearing polydiorganosiloxane reacts with a crosslinker in the presence of a platinum catalyst to form a cured film, a crosslink structure of finer network forms, from which an improvement in the function of anchoring component (A) within the cured film is expected. It is noted that the viscosity is an absolute viscosity as measured at 25° C. by a Brookfield rotational viscometer (the same applies hereinafter).

The structure of component (B-1) is exemplified by the general formulae (B-1a) and (B-1b).

[Chemical Formula 2]

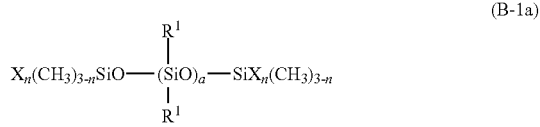

(B-1a)

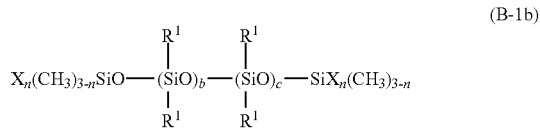

(B-1b)

Herein, X is an aliphatic unsaturated group of 2 to 10 carbon atoms; n is an integer of 1 to 3; $R^1$ which may be the same or different is a substituted or unsubstituted, monovalent hydrocarbon group of 1 to 10 carbon atoms free of aliphatic unsaturation; a, b and c are integers such that aliphatic unsaturated groups may account for at least 0.01 mol % of all organic groups directly bonded to silicon and the viscosity may fall in the range of 0.001 to 100 Pa·s at 25° C.

In the formulae, X is an aliphatic unsaturated group, examples of which include alkenyl groups of 2 to 6 carbon atoms such as vinyl, allyl, and hexenyl, with vinyl being preferred.

The substituent $R^1$ is a substituted or unsubstituted, monovalent hydrocarbon group of 1 to 10 carbon atoms free of aliphatic unsaturation, examples of which include alkyl groups such as methyl, ethyl, propyl, butyl, pentyl, hexyl and octyl, cycloalkyl groups such as cyclohexyl, and substituted forms of the foregoing in which one or more or all carbon-bonded hydrogen atoms are substituted by halogen atoms, cyano or alkoxy groups.

While $R^1$ may be the same or different, it is preferred from the practical aspect that $R^1$, a, b and c are such that at least 80% of entire $R^1$ groups may be methyl.

The polydiorganosiloxane as component (B-1) basically has a linear molecular structure, although it may contain in its molecule a branched structure originating from trifunctional and/or tetrafunctional siloxane units as long as the benefits of the invention are not affected.

Component (B-1) is blended in an amount of 1 to 1,000 parts by weight, preferably 1 to 900 parts by weight per 100 parts by weight of component (A). Less than 1 pbw of component (B-1) may fail in blending effect whereas more than 1,000 pbw may function to suppress the release force increasing effect of the high-release additive.

On the other hand, component (B-2) is a hydroxyl-bearing polydiorganosiloxane containing a hydroxyl group, preferably at least two hydroxyl groups per molecule and having a viscosity of up to 100 Pa·s at 25° C. The preferred viscosity, blending amount, and structure are like component (B-1), and exemplary structures are represented by formulae equivalent to the above formulae (B-1a) and (B-1b), except that the substituent X is a hydroxyl group and n=1.

Component (C-1) is a crosslinker commonly used in release sheet-forming compositions of addition reaction type, and specifically an organohydrogenpolysiloxane containing at least two silicon-bonded hydrogen atoms (Si—H groups) per molecule. From the goal of obtaining an emulsion composition, the viscosity of component (C-1) is in a similar range to component (B-1). A viscosity of up to 1 Pa·s at 25° C. is preferred from the industrial aspect.

As the structure of component (C-1), an organohydrogenpolysiloxane having the general formula (C-1a) is exemplary.

[Chemical Formula 3]

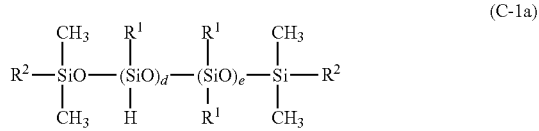

(C-1a)

Herein $R^1$ is as defined in the above formula (B-1b); $R^2$ which may be the same or different is hydrogen or a substituted or unsubstituted, monovalent hydrocarbon group of 1 to 10 carbon atoms free of aliphatic unsaturation; d and e are integers such that silicon-bonded hydrogen atoms may account for 10 to 50 mol % of all silicon-bonded substituent groups and the viscosity may fall in the range of 0.005 to 1 Pa·s at 25° C.

In formula (C-1a), the substituent $R^2$ is hydrogen or a substituted or unsubstituted, monovalent hydrocarbon group of 1 to 10 carbon atoms free of aliphatic unsaturation and aromatic substituents, like the above-mentioned substituent $R^1$. Examples of the monovalent hydrocarbon group include alkyl groups such as methyl, ethyl, propyl, butyl, pentyl, hexyl and octyl, cycloalkyl groups such as cyclohexyl, and substituted forms of the foregoing in which one or more or all carbon-bonded hydrogen atoms are substituted by halogen atoms, cyano or alkoxy groups. Inter alia, methyl is preferred. It is preferred from the practical aspect that at least 80 mol % of $R^2$ be methyl.

The silicon-bonded hydrogen atoms account for 10 to 50 mol % of all silicon-bonded substituent groups.

Preferably component (C-1) has a substantially linear structure, although it may contain in its molecule a branched structure originating from trifunctional and/or tetrafunctional siloxane units like component (B-1) or take a cyclic structure.

Component (C-1) is blended in an amount that does not compromise the essential performance of a release sheet-forming composition of addition cure type to which the emulsion high-release additive of the invention is added. In general, component (C-1) is desirably blended in such an amount that the molar amount of Si—H groups may be 0.1 to 10 times, more preferably 0.2 to 9 times, and even more preferably 0.3 to 8 times the total molar amount of aliphatic unsaturated groups, typically alkenyl groups, in components (A) and (B-1).

Component (C-1) may also be used when the inventive composition is added to a release sheet-forming composition of condensation cure type. In this embodiment, component (C-1) is desirably blended in such an amount that the molar amount of Si—H groups in component (C-1) may be 0.1 to 200 times, more preferably 0.2 to 180 times, and even more preferably 0.3 to 150 times the total molar amount of hydroxyl groups in components (A) and (B-2).

Component (C-2) is a crosslinker commonly used in release sheet-forming compositions of condensation reaction type, and specifically a hydrolyzable group-containing organosilane or polyorganosiloxane containing at least two hydrolyzable groups per molecule and having a viscosity of up to 1 Pa·s at 25° C. The preferred viscosity and structure are like component (C-1), except that H in formula (C-1a) is replaced by a hydrolyzable group.

In component (C-2), suitable hydrolyzable groups include alkoxy groups such as methoxy, ethoxy, propoxy, butoxy, methoxyethoxy, and isopropenoxy, and acyloxy groups such as acetoxy, directly bonded to silicon, while an amino group such as ethylamino, amide group, oxime group such as ethylmethylbutanoxime, or a group having halogen atom such as chlorine or bromine may be admixed in part.

Specifically, hydrolyzable group-containing organosilanes and polyorganosiloxanes as shown below may be used. Those having hydrolyzable groups which are methoxy, ethoxy, propoxy or butoxy are preferred from the industrial aspect.

$$R^4{}_h SiR^5{}_{4-h}$$

(Herein $R^4$ is a monovalent hydrocarbon group, typically alkyl group of 1 to 10 carbon atoms, preferably methyl, $R^5$ is a hydrolyzable group, preferably alkoxy group, and h is 0, 1 or 2.)

[Chemical Formula 4]

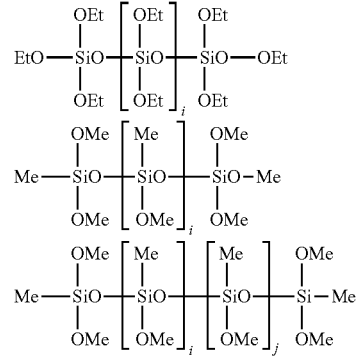

(Herein i and j each are 0 to 100, Me is methyl, and Et is ethyl.)

In these examples, some alkoxy groups may be replaced by such groups as $CH_3COO$—, $CH_3(C_2H_5)C$=$NO$—, $(C_2H_5)_2N$—$CH_3CO(C_2H_5)N$— or $CH_2$=$(CH_3)CO$—.

Component (C-2) is blended in an amount that does not compromise the essential performance of a curable release sheet-forming composition to which the emulsion high-release additive of the invention is added. In general, component (C-2) is desirably blended in such an amount that the molar amount of hydrolyzable groups may be 0.1 to 200 times, more preferably 0.2 to 200 times, and even more preferably 0.2 to 180 times the total molar amount of hydroxyl groups in components (A) and (B).

Component (D) is an emulsifier. Emulsifiers useful to prepare silicone emulsion compositions are well known. A choice may be made among commercially available surfactants, polymeric surfactants, and water-soluble polymers may be used although it is prohibited to use the compound that compromises the essential performance of a release sheet-forming composition of addition or condensation cure type to which the high-release additive of the invention is added. In general, nonionic surfactants, water-soluble polymers such as polyvinyl alcohol and methylcellulose, and derivatives thereof are preferably used. Insofar as the benefits of the emulsion composition of the invention are not adversely affected, cationic and anionic surfactants may be used in combination, with improvements in wetting and leveling properties being expectable.

Examples of the nonionic surfactants which can be used herein include alkyl allyl ethers such as polyoxyethylene nonylphenyl ether and polyoxyethylene octylphenyl ether, alkyl ethers such as polyoxyethylene lauryl ether and polyoxyethylene tridecyl ether, and alkyl esters such as polyoxyethylene oleate and polyoxyethylene laurate. Inter alia, polyoxyethylene alkyl ethers are preferred from the emulsifying and safety aspects.

More desirably the nonionic surfactant should have a HLB of 9 to 16, a pH value of 8 or below, and a low content of alkaline impurities. Also polyvinyl alcohol (PVA), cellulose derivatives such as cellulose ether, and denatured starch may be added. It is preferred to add PVA having a degree of saponification of 85 to 98 mol % and a viscosity of 0.004 to 0.1 Pa·s as measured at 20° C. in 4 wt % aqueous solution because the resulting emulsion composition is improved in stability.

Component (D) is preferably blended in an amount of 0.1 to 20 parts by weight per 100 parts by weight of components (A), (B-1), (B-2), (C-1), and (C-2) combined. With less than 0.1 part by weight of component (D), no addition effect may be exerted and the emulsion composition may not be improved in storage stability. More than 20 parts by weight of component (D) may compromise the essential performance of a release sheet-forming composition of addition or condensation cure type to which the high-release additive of the invention is added.

In the emulsion composition of the invention, (E) a cure catalyst which is one component of the curable release sheet-forming composition may be blended insofar as the performance of the inventive composition is not compromised. Component (E) used herein may be either (E-1) an addition curing catalyst or (E-2) a condensation curing catalyst.

Suitable addition curing catalysts (E-1) used herein include platinum-based catalysts, especially platinum-based complexes (e.g., complexes of platinum or platinum compounds with polysiloxane, complex salts of chloroplatinic acid with olefins). This component is used as a catalyst for addition reaction. When the catalyst is blended in an emulsion composition, it is desirably used in the form of a platinum complex-containing polysiloxane. The platinum complex-containing polysiloxane should preferably have a viscosity of 10 to 500 mPa·s at 25° C.

Blending of the platinum catalyst in an emulsion composition is advantageous in that the catalyst can be readily, rapidly and uniformly dispersed in the emulsion composition, and as a result, cured films with good performance are obtainable in a consistent manner. The same is also effective for improving shelf life and pot life.

As the condensation curing catalyst (E-2), compounds of magnesium, aluminum, titanium, chromium, iron, cobalt, nickel, copper, zinc, zirconium and bismuth may be used. Preferred are organic acid salts of trivalent aluminum, trivalent iron, trivalent cobalt, divalent zinc, tetravalent zirconium, and trivalent bismuth and metal compounds such as alkoxides and chelates. Examples include salts of organic acids such as octylic acid, lauric acid and stearic acid, alkoxides such as propoxide and butoxide, and multidentate ligand chelates such as catechols, crown ethers, polyfunctional carboxylic acids, hydroxy acids, diketones, and ketoacids. Coordination of a plurality of different ligands to one metal is acceptable.

In this regard, better results are obtained when component (E-1) is used together with components (A), (B-1) and (C-1), and component (E-2) is used together with components (A), (B-2) and (C-2).

Although component (E) is optional, it is generally blended in an amount of 0 to 10 parts by weight per 100 parts by weight of the sum of components (A), (B-1) or (B-2), and (C-1) or (C-2) and when used, in an amount of 0.001 to 10 parts by weight.

Further, a pot-life extender may be blended as component (F).

The pot-life extender as component (F) is blended as a reaction controlling agent for extending the pot-life of a curable release sheet-forming composition to which the inventive composition has been added and further the catalyst has been added and mixed.

In the composition of addition cure type, any activity control agent selected from various organic nitrogen compounds, organic phosphorus compounds, acetylenic compounds, and alkenyl-containing siloxane compounds may be used for the purpose of controlling the activity of a platinum-based catalyst such as platinum complex catalyst.

In the composition of condensation cure type, any agent selected from carboxylic acid compounds and amino compounds may be used.

Component (F) is optional. Although the amount of component (F) is adjusted depending on a selected compound or service situation, the amount of component (F) blended is generally 0 to 10 parts by weight per 100 parts by weight of the sum of components (A), (B-1) or (B-2), and (C-1) or (C-2) and when used, 0.01 to 10 parts by weight. Less than 0.01 part by weight of component (F) may be ineffective whereas more than 10 parts by weight may detract from curability.

The emulsion composition of the invention is obtained by mixing predetermined amounts of components uniformly and emulsifying on a homogenizer or the like.

To the composition of the invention, various additives may be further blended insofar as the benefits of the invention are not impaired. It is optional to add sorbic acid, sorbic acid salts, and acetic acid for the purpose of preservation, water-soluble resins such as methyl cellulose and sodium carboxymethyl cellulose for preventing penetration into porous substrates, a leveling agent or a minute amount of solvent for improving leveling during coating operation, and a minute amount of non-reactive organopolysiloxane as lubricant.

On use of the emulsion high-release additive of the invention, the procedure of adding the additive to a commercially available curable silicone composition (silicone emulsion composition) for forming release sheet such as release paper or release film, mixing them to form a coating solution, and applying the coating solution is recommended because this procedure may comply with a variety of performance requirements. However, when a plurality of emulsions are mixed, sometimes the stability, coating, wetting and other properties of the emulsion can be reduced beyond the expectation. In such a case, preferably a curable silicone composition (silicone emulsion composition) of addition or condensation cure type for forming release sheet such as release paper or release film, to which the condensation product as component (A) according to the invention has been added, is prepared, that is, a silicone emulsion composition which can be used essentially alone as coating solution is prepared. The desired formulation of such silicone emulsion composition is as follows.

Component (A): 100 parts by weight of a component similar to above component (A),
Component (B): 50 to 2,000 parts by weight of a component similar to above component (B-1) or (B-2),
Component (C): a component similar to above component (C-1) and/or (C-2),
 component (C-1) in such an amount that the molar amount of Si—H groups is 1 to 10 times the molar amount of total alkenyl groups in components (A) and (B); component (C-2) in such an amount that the molar amount of hydrolyzable groups is 1 to 200 times the molar amount of total hydroxyl groups in components (A) and (B)
Emulsifier (D): a component similar to above component (D), in an amount of 0.1 to 20 parts by weight per 100 parts by weight of components (A), (B) and (C) combined
Cure catalyst (E): a component similar to above component (E-1) and/or (E-2), in an amount of 0.001 to 10 parts by weight per 100 parts by weight of components (A), (B) and (C) combined
Pot-life extender (F): a component similar to above component (E), in an amount of 0 to 10 parts, especially 0.1 to 10 parts by weight per 100 parts by weight of components (A), (B) and (C) combined
Water (G): in an amount of 20 to 9,900 parts by weight per 100 parts by weight of components (A), (B) and (C) combined It is desired from the shelf life aspect that component (E) be separately prepared as a cure catalyst emulsion and this emulsion be added immediately before use of the composition.

On use of the emulsion high-release additive or the emulsion composition according to the invention, a coating solution is prepared by adding the additive or emulsion composition to a commercially available, release sheet-forming, curable silicone composition (silicone emulsion composition), and mixing them, or the additive or emulsion composition is prepared as a coating solution which can be applied alone as mentioned above, and the coating solution is applied to paper substrates or plastic substrates such as polyethylene terephthalate (PET), biaxially oriented polypropylene (OPP) and polyethylene (PE). As the coating technique, any desired one selected, for example, from roll coating, gravure coating, air knife coating, wire coating, doctor coating and brush coating may be employed.

The release sheet-forming curable silicone composition (silicone emulsion composition) of addition cure type, which is obtained by adding the emulsion high-release additive or the emulsion composition according to the invention, is coated onto a flexible thin-film material such as paper or film to a coating weight of 0.1 to 5 g/m² as solids, and treated at 80 to 200° C. for 5 seconds to 3 minutes on a heating roll, heating drum or circulating hot air dryer, for thereby forming a cured coating having desired release property.

From the release sheet-forming curable silicone composition of condensation cure type, a cured coating may be formed as in the case of the composition of addition cure type, but desirably via heat treatment at 100 to 200° C. for 10 seconds to 3 minutes.

EXAMPLES

The invention is now described by referring to Examples and Comparative Examples, although the invention is not limited thereto. In Examples, the viscosity is as measured at 25° C. by a Brookfield rotational viscometer unless otherwise stated. The methods of measuring the total functional group content and hydroxyl content are as follows. Tables 1 and 2 tabulate the results of evaluation by the methods described below. Notably, Me stands for methyl, Et for ethyl, Pr for propyl, and Vi for vinyl.

Method of Measuring Total Functional Group Content
[Hydrolyzable Group Content]
A molar fraction of Si and a molar fraction of hydrolyzable group are determined by $^{29}$Si—NMR, which is converted on a weight scale to a hydrolyzable group content (wt %). A molar fraction of Si and a molar fraction of alkoxy group are determined by $^{1}$H-NMR. A molar fraction of hydroxyl group is determined by subtracting the molar fraction of alkoxy group determined by $^{1}$H-NMR from the molar fraction of hydrolyzable group determined by $^{29}$Si—NMR, before it is converted to a wt % content.
[Hydroxyl Content]
A hydroxyl content is determined by subtracting a Si—OR group amount (wherein OR is OMe, OEt or OPr) determined by $^{1}$H-NMR from a Si—OX group amount (wherein X is H, Me, Et or Pr) determined by $^{29}$Si—NMR.
[Release Force]
Initial Release Force
A release sheet-forming silicone emulsion composition was coated onto the surface of glassine paper (basis weight 60 g/m²) to a coating weight of about 1.0 g/m² as silicone solids, and treated in a circulating hot air dryer at 170° C. for 30 seconds to form a cured coating, obtaining a silicone separator. The silicone separator was stored at 25° C. for 20 hours, and overlaid with a commercially available TESA-7475 tape (TESA SE). The assembly was stored under a load of 20 g/m² in a dryer at 70° C. for 20 hours, obtaining a test sample. Using a tensile tester, a force required for peeling was measured by pulling the TESA-7475 tape back from the test sample at an angle of 180° and a peel rate of 0.3 m/min, this being reported as an initial release force (N/25 mm).
Aged Release Force
A silicone separator obtained by the same curing method as above was stored at 50° C. for 7 days, and overlaid with TESA-7475 tape. The assembly was stored under a load of 20 g/m² in a dryer at 70° C. for 20 hours, obtaining a test sample. Using a tensile tester, a force required for peeling was measured by pulling the TESA-7475 tape back from the test sample at an angle of 180° and a peel rate of 0.3 m/min, this being reported as an aged release force (N/25 mm).
[Appearance and Stability]
Outer appearance was judged by visually observing an emulsion composition as prepared and rating it with symbol "○" for good appearance, "Δ" for suspended matter observed, and "x" for phase separation. Stability was judged by allowing an emulsion composition in a sealed state to stand at 25° C. for 10 days and visually observing its outer appearance.

Preparation of Emulsion High-Release Additive and Emulsion Composition in Table 1

Preparation Example 1

Synthesis of Component (A)

A solution was prepared by blending 50 parts by weight of both end hydroxydimethylsiloxy-capped linear dimethylpolysiloxane of formula (1) having an average DOP of 1,590 as component (A-1), 50 parts by weight as nonvolatile (125 parts by weight if inclusive of volatile) of a solution of polyorganosiloxane in 60 wt % toluene, i.e., toluene solution of a MQ resin, the MQ resin consisting of $Me_3SiO_{0.5}$ units (M units), $SiO_2$ units (Q units), $(CH_3O)SiO_{3/2}$ units, and $(HO)SiO_{3/2}$ units, wherein M/Q molar ratio=0.8, total content of hydroxyl and alkoxy (specifically methoxy) 4.29 wt % (hydroxyl content 1.19 wt %=0.07 mol/100 g, alkoxy content 3.1 wt %=0.10 mol/100 g) as component (A-2), 10 parts by weight of toluene, and 0.4 part by weight of 28 wt % aqueous ammonia. The solution was stirred at room temperature for 16 hours. Thereafter, in the system equipped with a Dean-Stark trap, toluene was refluxed at an internal temperature of 110-120° C. for removing ammonia and water, yielding a toluene solution of component (A), condensation product.

[Chemical Formula 5]

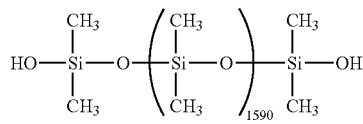

(1)

Preparation of Emulsion Composition

A nonvolatile content of the thus obtained toluene solution of condensation product was measured. To 100 parts by weight of the nonvolatile as component (A) was added 43 parts by weight of both end vinyldimethylsiloxy-capped linear dimethylpolysiloxane having an average DOP of 80, a viscosity of 100 mPa·s, and a vinyl content of 0.04 mol/100 g as component (B-1). Under vacuum and nitrogen bubbling conditions, the mixture was heated at 150° C. to remove toluene.

After the toluene removal, the container was charged with 3.5 parts by weight (providing 2 moles of Si—H group per mole of Vi group) of methylhydrogenpolysiloxane capped with trimethylsilyl at both ends of its molecular chain, having side chains consisting of dimethylsiloxane and methylhydrogensiloxane units, and having a viscosity of 50 mPa·s (silicon-bonded hydrogen content 35 mol %, Si—H content 1.1 mol/100 g) as component (C-1), 2 parts by weight of polyoxyethylene alkyl ether surfactant (HLB 13.6, pH 5.4) as component (D), and 3 parts by weight of polyvinyl alcohol having a degree of saponification of 90 mol % and a viscosity of 20 mPa·s as measured at 20° C. in 4 wt % aqueous solution, which were mixed together.

Water, 581 parts by weight, was added to the mixture, which was mixed on a homomixer and then processed on a homogenizer, yielding a homogeneous emulsion composition. This composition had a silicone content of 20 wt % and a viscosity of 70 mPa·s.

Preparation Example 2

An emulsion composition was obtained by the same procedure as in Preparation Example 1 using the same ingredients and amounts except that the both end hydroxydimethylsiloxy-capped linear dimethylpolysiloxane as component (A-1) was replaced by a dimethylpolysiloxane of formula (2) having an average DOP of 1,050.

[Chemical Formula 6]

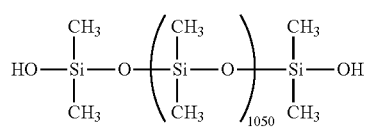

(2)

Preparation Example 3

An emulsion composition was obtained by the same procedure as in Preparation Example 1 using the same ingredients and amounts except that the both end hydroxydimethylsiloxy-capped linear dimethylpolysiloxane as component (A-1) was replaced by a dimethylpolysiloxane of formula (3) having an average DOP of 610.

[Chemical Formula 7]

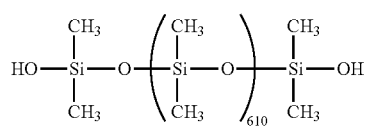

(3)

Preparation Example 4

An emulsion composition was obtained by the same procedure as in Preparation Example 1 using the same ingredients and amounts except that the both end hydroxydimethylsiloxy-capped linear dimethylpolysiloxane as component (A-1) was replaced by a dimethylpolysiloxane of formula (4) having an average DOP of 470.

[Chemical Formula 8]

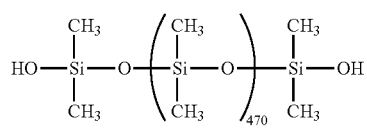

(4)

Preparation Example 5

An emulsion composition was obtained by the same procedure as in Preparation Example 1 using the same ingredients and amounts except that the both end hydroxydimethylsiloxy-capped linear dimethylpolysiloxane as component (A-1) was replaced by a dimethylpolysiloxane of formula (5) having an average DOP of 390.

[Chemical Formula 9]

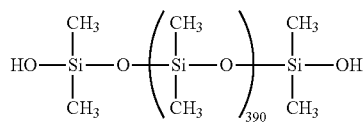

(5)

Preparation Example 6

An emulsion composition was obtained by the same procedure as in Preparation Example 1 using the same ingredients and amounts except that the both end hydroxydimethylsiloxy-capped linear dimethylpolysiloxane as component (A-1) was replaced by a dimethylpolysiloxane of formula (6) having an average DOP of 150.

[Chemical Formula 10]

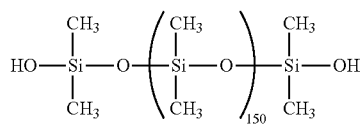

(6)

Preparation Example 7

An emulsion composition of Preparation Example 7 is obtained by merely mixing the ingredients of Preparation Example 1 without dehydration condensation reaction, adding both end vinyldimethylsiloxy-capped linear dimethylpolysiloxane thereto, and then removing the solvent.

A solution was prepared by blending 50 parts by weight of both end hydroxydimethylsiloxy-capped linear dimethylpolysiloxane of formula (1) as component (A-1), 50 parts by weight as nonvolatile (125 parts by weight if inclusive of volatile) of a solution of polysiloxane in 60 wt % toluene, i.e., toluene solution of a MQ resin, the MQ resin consisting of $Me_3SiO_{0.5}$ units (M units), $SiO_2$ units (Q units), $(CH_3O)SiO_{3/2}$ units, and $(HO)SiO_{3/2}$ units, wherein M/Q molar ratio=0.8, total content of hydroxyl and alkoxy 4.29 wt % (hydroxyl content 1.19 wt %=0.07 mol/100 g, alkoxy content 3.1 wt %=0.10 mol/100 g) as component (A-2), and 10 parts by weight of toluene. In the system equipped with a Dean-Stark trap, toluene was refluxed at an internal temperature of 110-120° C. for removing water, yielding component (A) which had not undergone dehydration condensation reaction.

The subsequent steps were conducted as in Preparation Example 1, obtaining an emulsion composition.

Preparation Example 8

Synthesis of Component (A)

A solution was prepared by blending 50 parts by weight of both end hydroxydimethylsiloxy-capped linear dimethylpolysiloxane of formula (1) having an average DOP of 1,590 as component (A-1), 50 parts by weight as nonvolatile (125 parts by weight if inclusive of volatile) of a solution of polysiloxane in 60 wt % toluene, i.e., toluene solution of a MQ resin, the MQ resin consisting of $Me_3SiO_{0.5}$ units (M units), $SiO_2$ units (Q units), $(CH_3O)SiO_{3/2}$ units, and $(HO)SiO_{3/2}$ units, wherein M/Q molar ratio=0.8, total content of hydroxyl and alkoxy 1.89 wt % (hydroxyl content 0.34 wt %=0.02 mol/100 g, alkoxy content 1.55 wt %=0.05 mol/100 g) as component (A-2), 10 parts by weight of toluene, and 0.4 part by weight of 28 wt % aqueous ammonia. The solution was stirred at room temperature for 16 hours. Thereafter, in the system equipped with a Dean-Stark trap, toluene was refluxed at an internal temperature of 110-120° C. for removing ammonia and water, yielding a toluene solution of component (A).

A nonvolatile content of the thus obtained toluene solution of condensation product was measured. To 100 parts by weight of the nonvolatile as component (A) was added 43 parts by weight of both end vinyldimethylsiloxy-capped linear dimethylpolysiloxane having an average DOP of 80, a viscosity of 100 mPa·s, and a vinyl content of 0.04 mol/100 g as component (B-1). Under vacuum and nitrogen bubbling conditions, the mixture was heated at 150° C. to remove toluene.

After the toluene removal, the container was charged with 3.5 parts by weight (providing 2 moles of Si—H group per mole of Vi group) of methylhydrogenpolysiloxane capped with trimethylsilyl at both ends of its molecular chain, having side chains consisting of dimethylsiloxane and methylhydrogensiloxane units, and having a viscosity of 50 mPa·s (silicon-bonded hydrogen content 35 mol %, Si—H content 1.1 mol/100 g) as component (C-1), 2 parts by weight of polyoxyethylene alkyl ether surfactant (HLB 13.6, pH 5.4) as component (D), and 3 parts by weight of polyvinyl alcohol having a degree of saponification of 90 mol % and a viscosity of 20 mPa·s as measured at 20° C. in 4 wt % aqueous solution, which were mixed together.

Water, 581 parts by weight, was added to the mixture, which was mixed on a homomixer and then processed on a homogenizer, yielding a homogeneous emulsion composition. This composition had a silicone content of 20 wt % and a viscosity of 50 mPa·s.

Preparation Example 9

An emulsion composition was obtained by the same procedure as in Preparation Example 8 using the same ingredients and amounts except that the both end hydroxydimethylsiloxy-capped linear dimethylpolysiloxane as component (A-1) was replaced by a dimethylpolysiloxane of formula (5) having an average DOP of 390.

Preparation Example 10

An emulsion composition was obtained by the same procedure as in Preparation Example 1 using the same ingredients and amounts except that the both end hydroxydimethylsiloxy-capped linear dimethylpolysiloxane as component (A-1) was replaced by a dimethylpolysiloxane of formula (7) having an average DOP of 90.

[Chemical Formula 11]

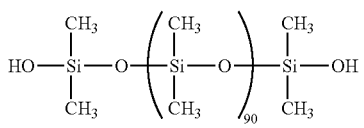

(7)

Preparation of Emulsion Composition in Table 2

Preparation Example 11

A solution was prepared by blending 20 parts by weight of both end hydroxydimethylsiloxy-capped linear dimethylpolysiloxane of formula (1) having an average DOP of 1,590 as component (A-1), 80 parts by weight as nonvolatile (200 parts by weight if inclusive of volatile) of a solution of polyorganosiloxane in 60 wt % toluene, i.e., toluene solution of a MQ resin, the MQ resin consisting of $Me_3SiO_{0.5}$ units (M units), $SiO_2$ units (Q units), $(CH_3O)SiO_{3/2}$ units, and $(HO)SiO_{3/2}$ units, wherein M/Q molar ratio=0.8, total content of hydroxyl and alkoxy (specifically methoxy) 3.64 wt % (hydroxyl content 0.85 wt %=0.05 mol/100 g, alkoxy content 2.79 wt %=0.09 mol/100 g) as component (A-2), 10 parts by weight of toluene, and 0.4 part by weight of 28 wt % aqueous ammonia. The solution was stirred at room temperature for 16 hours. Thereafter, in the system equipped with a Dean-Stark trap, toluene was refluxed at an internal temperature of 110-120° C. for removing ammonia and water, yielding a toluene solution of component (A).

A nonvolatile content of the thus obtained toluene solution of condensation product was measured. To 100 parts by weight of the nonvolatile as component (A) was added 43 parts by weight of both end vinyldimethylsiloxy-capped linear dimethylpolysiloxane having an average DOP of 80, a viscosity of 100 mPa·s, and a vinyl content of 0.04 mol/100 g as component (B-1). Under vacuum and nitrogen bubbling conditions, the mixture was heated at 150° C. to remove toluene.

After the toluene removal, the container was charged with 3.5 parts by weight (providing 2 moles of Si—H group per mole of Vi group) of methylhydrogenpolysiloxane capped with trimethylsilyl at both ends of its molecular chain, having side chains consisting of dimethylsiloxane and methylhydrogensiloxane units, and having a viscosity of 50 mPa·s (silicon-bonded hydrogen content 35 mol %, Si—H content 1.1 mol/100 g) as component (C-1), 2 parts by weight of polyoxyethylene alkyl ether surfactant (HLB 13.6, pH 5.4) as component (D), and 3 parts by weight of polyvinyl alcohol having a degree of saponification of 90 mol % and a viscosity of 20 mPa·s as measured at 20° C. in 4 wt % aqueous solution, which were mixed together.

Water, 581 parts by weight, was added to the mixture, which was mixed on a homomixer and then processed on a homogenizer, yielding a homogeneous emulsion composition. This composition had a silicone content of 20 wt % and a viscosity of 50 mPa·s.

Preparation Example 12

An emulsion composition was prepared by the same procedure as in Preparation Example 11 using the same ingredients except that 30 parts by weight of the linear dimethylpolysiloxane of formula (1) as component (A-1) and 70 parts by weight as the nonvolatile of the MQ resin toluene solution as component (A-2) were blended.

Preparation Example 13

An emulsion composition was prepared by the same procedure as in Preparation Example 11 using the same ingredients except that 40 parts by weight of the linear dimethylpolysiloxane of formula (1) as component (A-1) and 60 parts by weight as the nonvolatile of the MQ resin toluene solution as component (A-2) were blended.

Preparation Example 14

An emulsion composition was prepared by the same procedure as in Preparation Example 11 using the same ingredients except that 50 parts by weight of the linear dimethylpolysiloxane of formula (1) as component (A-1) and 50 parts by weight as the nonvolatile of the MQ resin toluene solution as component (A-2) were blended.

Preparation Example 15

An emulsion composition was prepared by the same procedure as in Preparation Example 11 using the same ingredients except that 60 parts by weight of the linear dimethylpolysiloxane of formula (1) as component (A-1) and 40 parts by weight as the nonvolatile of the MQ resin toluene solution as component (A-2) were blended.

Preparation Example 16

An emulsion composition was prepared by the same procedure as in Preparation Example 11 using the same ingredients except that 70 parts by weight of the linear dimethylpolysiloxane of formula (1) as component (A-1) and 30 parts by weight as the nonvolatile of the MQ resin toluene solution as component (A-2) were blended.

Preparation Example 17

An emulsion composition was prepared by the same procedure as in Preparation Example 11 using the same ingredients except that 80 parts by weight of the linear dimethylpolysiloxane of formula (1) as component (A-1) and 20 parts by weight as the nonvolatile of the MQ resin toluene solution as component (A-2) were blended.

Preparation Example 18

A solution was prepared by blending 50 parts by weight of both end hydroxydimethylsiloxy-capped linear dimethylpolysiloxane of formula (1) as component (A-1), 50 parts by weight as nonvolatile (125 parts by weight if inclusive of volatile) of a solution of polyorganosiloxane in 60 wt % toluene, i.e., toluene solution of a MQ resin, the MQ resin consisting of $Me_3SiO_{0.5}$ units (M units), $SiO_2$ units (Q units), $(CH_3O)SiO_{3/2}$ units, and $(HO)SiO_{3/2}$ units, wherein M/Q molar ratio=0.8, total content of hydroxyl and alkoxy 3.64 wt % (hydroxyl content 0.85 wt %=0.05 mol/100 g, alkoxy content 2.79 wt %=0.09 mol/100 g) as component (A-2), 10 parts by weight of toluene, and 0.4 part by weight of 28 wt % aqueous ammonia. The solution was stirred at room temperature for 16 hours. Thereafter, in the system equipped with a Dean-Stark trap, toluene was refluxed at an internal temperature of 110-120° C. for removing ammonia and water, yielding a toluene solution of component (A).

A nonvolatile content of the thus obtained toluene solution of condensation product was measured. To 100 parts by weight of the nonvolatile as component (A) was added 43 parts by weight of both end hydroxyl-capped linear dimethylpolysiloxane a viscosity of 0.5 Pa·s, and a hydroxyl content of 0.015 mol/100 g as component (B-2). Under vacuum and nitrogen bubbling conditions, the mixture was heated at 150° C. to remove toluene.

After the toluene removal, the container was charged with 13 parts by weight of methylmethoxypolysiloxane or a partial hydrolytic condensate of $MeSi(OMe)_3$, having a viscosity of 10 mPa·s (a hydrolyzable group content 1.5 mol/100 g and a molar ratio of hydrolyzable group to hydroxyl group 10) as component (C-2), 2 parts by weight of polyoxyethylene alkyl ether surfactant (HLB 13.6, pH 5.4) as component (D), and 3 parts by weight of polyvinyl alcohol having a degree of saponification of 90 mol % and a viscosity of 20 mPa·s as measured at 20° C. in 4 wt % aqueous solution, which were mixed together. 619 parts by weight of water was added to the mixture, which was mixed on a homomixer and then processed on a homogenizer, yielding a homogeneous emulsion composition. This composition had a silicone content of 20 wt % and a viscosity of 70 mPa·s.

Preparation of Emulsion Release Paper-Forming Base Composition and Catalyst Composition Preparation Example 19

Emulsion Addition-Curing Base Composition

A container was charged with 100 parts by weight of both end vinyldimethylsiloxy-capped linear dimethylpolysiloxane having a viscosity of 500 mPa·s and a vinyl content of 0.015 mol/100 g, 2 parts by weight (providing 1.5 moles of Si—H group per mole of Vi group) of methylhydrogenpolysiloxane capped with trimethylsilyl at both ends of its molecular chain, having side chains consisting of dimethylsiloxane and methylhydrogensiloxane units, and having a viscosity of 50 mPa·s (silicon-bonded hydrogen content 35 mol %, Si—H content 1.1 mol/100 g), 2 parts by weight of polyoxyethylene alkyl ether surfactant (HLB 13.6, pH 5.4), 5 parts by weight of polyvinyl alcohol having a degree of saponification of 90 mol % and a viscosity of 20 mPa·s as measured at 20° C. in 4 wt % aqueous solution, 412 parts by weight of water, and 0.5 part by weight of ethynyl cyclohexanol as reaction inhibitor, which were mixed on a homomixer and processed on a homogenizer to form a homogeneous emulsion addition-curing base composition. This composition had a silicone content of 20 wt % and a viscosity of 50 mPa·s.

Preparation Example 20

Emulsion Catalyst Composition

A container was charged with 100 parts by weight of a dispersion of a platinum-vinylsiloxane complex salt in a both end vinyldimethylsiloxy-capped linear dimethylpolysiloxane with a viscosity of 500 mPa·s and a vinyl content of 0.015 mol/100 g (platinum content 5,000 ppm of platinum), 2 parts by weight of polyoxyethylene alkyl ether surfactant (HLB 13.6, pH 5.4), 5 parts by weight of polyvinyl alcohol having a degree of saponification of 90 mol % and a viscosity of 20 mPa·s as measured at 20° C. in 4 wt % aqueous solution, and 393 parts by weight of water, which were mixed on a homomixer and processed on a homogenizer to form a homogeneous emulsion catalyst composition. This composition had a silicone content of 20 wt % and a viscosity of 60 mPa·s.

Preparation Example 21

Emulsion Condensation-Curing Base Composition

A container was charged with 100 parts by weight of both end hydroxyl-capped linear dimethylpolysiloxane having a viscosity of 10 Pa·s and a hydroxyl content of 0.005 mol/100 g, 3 parts by weight of methylmethoxypolysiloxane or a partial hydrolytic condensate of MeSi(OMe)$_3$, having a viscosity of 10 mPa·s (a hydrolyzable group content 1.5 mol/100 g and a molar ratio of hydrolyzable group to hydroxyl group 10), 2 parts by weight of polyoxyethylene alkyl ether surfactant (HLB 13.6, pH 5.4), 5 parts by weight of polyvinyl alcohol having a degree of saponification of 90 mol % and a viscosity of 20 mPa·s as measured at 20° C. in 4 wt % aqueous solution, and 412 parts by weight of water, which were mixed on a homomixer and processed on a homogenizer to form a homogeneous emulsion composition. This composition had a silicone content of 20 wt % and a viscosity of 50 mPa·s.

Examples and Comparative Examples

Preparation of Release Paper-Forming Curable Silicone Composition (Silicone Emulsion)

In Examples 1 to 14 and Comparative Examples 1 to 6, a series of release paper-forming addition-curing silicone emulsion compositions were prepared by blending 20 parts by weight of the emulsion compositions obtained in Preparation Examples 1 to 18, 100 parts by weight of the emulsion addition-curing base composition of Preparation Example 19, and 3 parts by weight of the emulsion catalyst composition of Preparation Example 20, and thoroughly mixing them. It is noted that only Comparative Example 1 is a blend of Preparation Example 19 and Preparation Example 20.

In Example 12, a release paper-forming condensation-curing silicone emulsion composition was prepared by blending 20 parts by weight of the emulsion composition obtained in Preparation Example 18 with 100 parts by weight of the emulsion condensation-curing base composition of Preparation Example 21, adding 1 part by weight as aluminum of a 50 wt % solution of aluminum(III) triacetylacetonate in ethanol, and thoroughly mixing them. In Comparative Example 6, a release paper-forming emulsion composition was prepared as in Example 12 aside from omitting Preparation Example 18.

These silicone emulsion compositions were evaluated for outer appearance, stability, release force, and hydroxyl content by the above-mentioned methods. All silicone emulsion compositions cured without raising any problems.

TABLE 1

Relationship of release force to varying DOP of both end hydroxyl-capped polydimethylsiloxane, one ingredient of high-release additive

| | High-release additive (average DOP of component (A-1)) | Total functional group content* of component (A-2), wt % | Hydroxyl content of component (A) as condensed, wt % | Initial release force, N/25 mm | Aged release force, N/25 mm | Appearance stability |
|---|---|---|---|---|---|---|
| Example 1 | Preparation Example 1 (1,590) | 4.29 | 0.22 | 1.10 | 0.88 | ○ |
| Example 2 | Preparation Example 2 (1,050) | 4.29 | 0.22 | 0.92 | 0.80 | ○ |
| Example 3 | Preparation Example 3 (610) | 4.29 | 0.24 | 0.75 | 0.66 | ○ |
| Example 4 | Preparation Example 4 (470) | 4.29 | 0.24 | 0.67 | 0.56 | ○ |

TABLE 1-continued

Relationship of release force to varying DOP of both end hydroxyl-capped polydimethylsiloxane, one ingredient of high-release additive

| | High-release additive (average DOP of component (A-1)) | Total functional group content* of component (A-2), wt % | Hydroxyl content of component (A) as condensed, wt % | Initial release force, N/25 mm | Aged release force, N/25 mm | Appearance stability |
|---|---|---|---|---|---|---|
| Example 5 | Preparation Example 5 (390) | 4.29 | 0.26 | 0.59 | 0.48 | ○ |
| Example 6 | Preparation Example 6 (150) | 4.29 | 0.27 | 0.55 | 0.43 | ○ |
| Comparative Example 1 | Additive of Example 1 omitted | — | — | 0.15 | 0.08 | ○ |
| Comparative Example 2 | Preparation Example 7, Ingredients of Preparation Example 1 were mixed without dehydration condensation reaction | 4.29 | 0.07 | 0.17 | 0.07 | ○ |
| Comparative Example 3 | Preparation Example 8 (1,590) | 1.89 | 0.12 | 0.46 | 0.39 | ○ |
| Comparative Example 4 | Preparation Example 9 (390) | 1.89 | 0.14 | 0.38 | 0.30 | ○ |
| Comparative Example 5 | Preparation Example 10 (90) | 4.29 | 0.28 | 0.20 | 0.12 | ○ |

*total content of hydroxyl and alkoxy groups

TABLE 2

Relationship of release force to blending ratio of both end hydroxyl-capped polydimethylsiloxane as component (A-1) to MQ resin as component (A-2), which are ingredients of high-release additive

| | High-release additive (component (A-1): component (A-2)) | Total functional group content* of component (A-2), wt % | Hydroxyl content of component (A) as condensed, wt % | Initial release force, N/25 mm | Aged release force, N/25 mm | Appearance stability |
|---|---|---|---|---|---|---|
| Example 7 | Preparation Example 12 (30:70) | 3.64 | 0.24 | 0.90 | 0.78 | ○ |
| Example 8 | Preparation Example 13 (40:60) | 3.64 | 0.20 | 0.94 | 0.85 | ○ |
| Example 9 | Preparation Example 14 (50:50) | 3.64 | 0.20 | 1.05 | 0.92 | ○ |
| Example 10 | Preparation Example 15 (60:40) | 3.64 | 0.22 | 0.95 | 0.90 | ○ |
| Example 11 | Preparation Example 16 (70:30) | 3.64 | 0.25 | 0.85 | 0.82 | ○ |
| Example 12 | Preparation Example 18 (50:50) | 3.64 | 0.20 | 1.32 | 1.40 | ○ |
| Example 13 | Preparation Example 11 (20:80) | 3.64 | 0.43 | 0.48 | 0.41 | ○ |
| Example 14 | Preparation Example 17 (80:20) | 3.64 | 0.48 | 0.51 | 0.39 | ○ |
| Comparative Example 6 | Additive of Example 12 omitted | — | — | 0.25 | 0.22 | ○ |

*total content of hydroxyl and alkoxy groups

The invention claimed is:

1. An emulsion high-release additive for release sheets, comprising a condensation product (A) dispersed in water, the condensation product (A) having a residual hydroxyl group content of up to 0.3% by weight and being obtained from dehydration condensation reaction of (A-1) a polydiorganosiloxane having an average degree of polymerization of 100 to 3,000 and containing at least one hydroxyl group or hydrolyzable group per molecule with (A-2) a polyorganosiloxane resin primarily comprising $SiO_{4/2}$ units and $R_3SiO_{1/2}$ units, wherein each R is independently a monovalent hydrocarbon group of 1 to 12 carbon atoms free of aliphatic unsaturation or an alkenyl group of 2 to 6 carbon atoms, a molar ratio of $R_3SiO_{1/2}$ units to $SiO_{4/2}$ units is in the range of 0.6 to 1.2, said polyorganosiloxane resin further containing $R^3SiO_{3/2}$ units (T units) and optionally $R^3{}_2SiO_{2/2}$ units (D units), wherein $R^3$ is a hydroxyl group or a hydrolyzable group, provided that not all $R^3$ groups are hydroxyl groups, and the total content of hydroxyl and hydrolyzable groups is from 3.64% by weight to less than 10.0% by weight, wherein the polydiorganosiloxane (A-1) and the polyorganosiloxane resin (A-2) are mixed in a weight ratio of 30:70 to 70:30.

2. The emulsion high-release additive of claim 1, wherein the polydiorganosiloxane (A-1) contains two hydroxyl groups per molecule.

3. The emulsion high-release additive of claim 1 wherein the condensation product (A) is further treated with chlorosilane for neutralization and hydroxyl capping.

4. An emulsion composition for release sheets, obtained by dispersing components (A), (B-1) and (C-1) in water in the presence of component (D),
   (A) 100 parts by weight of the condensation product of claim 1,
   (B-1) 1 to 1,000 parts by weight of an aliphatic unsaturation-bearing polydiorganosiloxane containing at least two aliphatic unsaturated groups per molecule and having a viscosity of up to 100 Pa·s at 25° C.,
   (C-1) an organohydrogenpolysiloxane containing at least two Si—H groups per molecule and having a viscosity of up to 1 Pa·s at 25° C., in such an amount that the molar amount of Si—H groups is 0.1 to 10 times the total molar amount of aliphatic unsaturated groups in components (A) and (B-1),
   (D) an emulsifier in an amount of 0.1 to 20 parts by weight per 100 parts by weight of components (A), (B-1) and (C-1) combined.

5. An emulsion composition for release sheets, obtained by dispersing components (A), (B-2) and (C-2) in water in the presence of component (D),
   (A) 100 parts by weight of the condensation product of claim 1,
   (B-2) 1 to 1,000 parts by weight of a hydroxyl-bearing polydiorganosiloxane containing at least two hydroxyl groups per molecule and having a viscosity of up to 100 Pa·s at 25° C.,
   (C-2) a hydrolyzable group-bearing polyorganosiloxane containing at least two hydrolyzable groups per molecule and having a viscosity of up to 1 Pa·s at 25° C., in such an amount that the molar amount of hydrolyzable groups is 0.1 to 200 times the total molar amount of hydroxyl groups in components (A) and (B-2),
   (D) an emulsifier in an amount of 0.1 to 20 parts by weight per 100 parts by weight of components (A), (B-2) and (C-2) combined.

6. A release sheet comprising a sheet-like substrate and a cured film formed on at least one surface of the substrate from a curable silicone composition having added thereto the additive of claim 1 or the emulsion composition of claim 4 or 5.

7. The emulsion high-release additive for release sheets of claim 1, wherein the content of hydroxyl groups in component (A-2) is from 0.85 to 1.19% by weight and the content of hydrolyzable groups in component (A-2) is from 2.79 to 3.1% by weight.

8. The emulsion high-release additive for release sheets of claim 1, wherein the polydiorganosiloxane component (A-1) has the formula (A-1a)

[Chemical Formula 1]

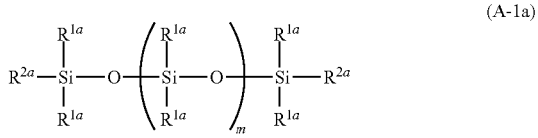

(A-1a)

wherein each $R^{1a}$ is independently a monovalent hydrocarbon group of 1 to 10 carbon atoms free of aliphatic unsaturation, each $R^{2a}$ is a hydroxyl group or hydrolyzable group, and m is an integer of 100 to 3,000.

9. The emulsion high-release additive for release sheets of claim 1, wherein the total content of hydroxyl and hydrolyzable groups in component (A-2) is from 3.64% by weight to less than 6.0% by weight.

10. The emulsion high-release additive for release sheets of claim 8, wherein the polydiorganosiloxane component (A-1) has one of the following formulas:

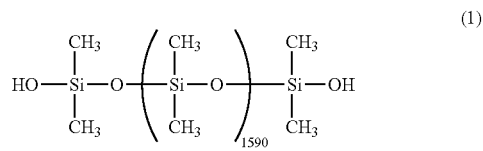

(1)

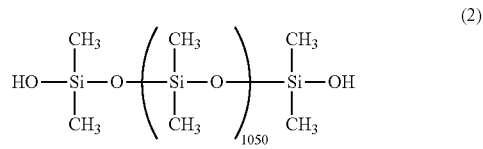

(2)

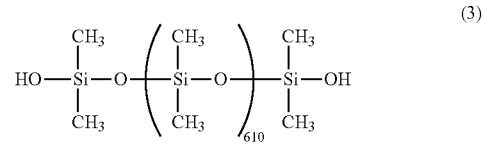

(3)

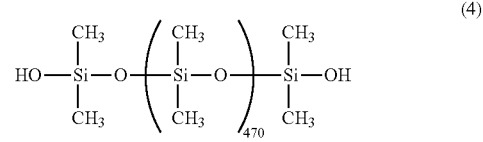

(4)

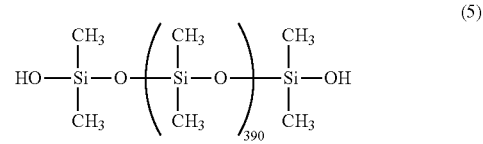

(5)

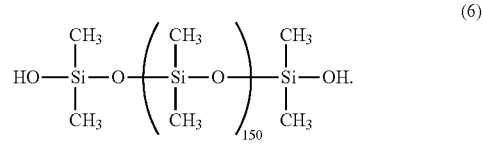

(6)

11. The emulsion high-release additive for release sheets of claim 1, wherein said condensation reaction is carried out at a temperature in the range 0 to 200° C. in the presence of from 0.001 to 10% by weight, based on the total weight of components (A-1) and (A-2), of a condensation catalyst.

12. The emulsion high-release additive for release sheets of claim 7, wherein component (A-2) is a resin selected from the group consisting of:
   (i) a resin consisting of $Me_3SiO_{0.5}$ units (M units), $SiO_2$ units (Q units), $(CH_3O)SiO_{3/2}$ units, and $(HO)SiO_{3/2}$ units, wherein an M/Q molar ratio=0.8, a total content of hydroxyl and methoxy=4.29 wt %, with hydroxyl content=1.19 wt % and methoxy content=3.1 wt %; and
   (ii) a resin consisting of $Me_3SiO_{0.5}$ units (M units), $SiO_2$ units (Q units), $(CH_3O)SiO_{3/2}$ units, and $(HO)SiO_{3/2}$ units, wherein an M/Q molar ratio=0.8, a total content of hydroxyl and methoxy=3.64 wt %, with hydroxyl content=0.85 wt % and methoxy content=2.79 wt %.

13. The release sheet of claim 6, wherein said substrate is selected from the group consisting of polyethylene terephthalate (PET), biaxially oriented polypropylene (OPP), polyethylene (PE), and paper.

* * * * *